United States Patent [19]

Ogawa et al.

[11] 4,121,021
[45] Oct. 17, 1978

[54] SILVER OXIDE PRIMARY CELL

[75] Inventors: Hiromichi Ogawa, Katano; Kenji Inoue, Hirakata; Akira Fujiwara, Shijonawate, all of Japan

[73] Assignee: Matsushita Electric Industrial Co., Ltd., Osaka, Japan

[21] Appl. No.: 813,775

[22] Filed: Jul. 7, 1977

[30] Foreign Application Priority Data

Jul. 7, 1976 [JP] Japan .................................. 51-81239

[51] Int. Cl.² ............................................. H01M 6/12
[52] U.S. Cl. .................................. 429/162; 429/219; 429/209
[58] Field of Search ................ 429/219, 162, 229–231, 429/209

[56] References Cited

U.S. PATENT DOCUMENTS

| 2,631,180 | 3/1953 | Robinson | 429/162 X |
| 2,649,492 | 8/1953 | Linton et al. | 429/162 X |
| 2,849,519 | 8/1958 | Freas et al. | 429/219 |
| 3,310,436 | 3/1967 | Ralston et al. | 429/231 X |
| 3,427,203 | 2/1969 | Fletcher | 429/219 |
| 3,575,723 | 4/1971 | Jerabek | 429/219 X |
| 3,655,450 | 4/1972 | Soto-Krebs | 429/219 X |
| 4,015,056 | 3/1977 | Mugahed | 429/219 |

Primary Examiner—Anthony Skapars
Attorney, Agent, or Firm—Wenderoth, Lind & Ponack

[57] ABSTRACT

A silver oxide primary cell of flat type comprising a casing composed of a cup and a cap electrically insulated from and received in the cup to define a sealed chamber between the cup and the cap. Within the sealed chamber is placed a stack of negative electrode, electrolyte absorbent layer, separator and positive electrode, with the negative and positive electrode held in contact with the cap and the cup, respectively. In order to avoid any possible sharp contact of the positive electrode with the separator, which may otherwise result in internal stresses set up in the separator, the positive electrode has at least one peripheral edge chamfered.

10 Claims, 7 Drawing Figures

SILVER OXIDE PRIMARY CELL

BACKGROUND OF THE INVENTION

The present invention generally relates to a primary battery and, more particularly, to a silver oxide cell of flat type comprising a positive electrode composed of silver oxide.

With development of the electronics technology, most electronic instruments, such as electronic calculators and electronic wrist watches, are currently manufactured in smaller and smaller size and this trend has now increased a demand for compact and small batteries which may be used as an external source of electric power to be installed in these electronic instruments. A button-type dry cell is one of the smallest primary batteries now commercially available and is disclosed, for example, in the U.S. Pat. No. 3,615,858, patented on Oct. 25, 1971. However, unlike the button-type dry cell, being somewhat complicated in shape, a flat-type dry cell of a substantially disc-like shape is also commercially available, which flat-type dry cell will now be discussed with reference to FIG. 1 of the accompanying drawing since the present invention pertains thereto.

The prior art flat-type dry cell, specifically, the silver-zinc cell, shown in longitudinal sectional view in FIG. 1, has a two-part container comprising a cap 1 and a cup 6. The cap 1 is made of either a clad plate of stainless steel lined with copper or tin-plated nickel steel plate and serves as a negative terminal member. The cap 1 has its peripheral portion flanged at 1a in a direction substantially perpendicular to the plane of the remaining central portion 1b of the cap 1 and then bent outwardly backwards to assume a substantially U-sectioned anchor rim 1c.

This cap 1 houses therein a zinc negative electrode 2 composed of a compacted mixture of amalgamated zinc powder with sodium salt of carboxymethyl cellulose expanded by absorption of electrolyte.

The cup 6 is made of either nickel-plated steel or stainless steel and serves as a positive terminal member. This cup 6 has its peripheral portion flanged at 6a in a direction substantially perpendicular to the plane of the remaining central portion 6b of the cup 6 and in a direction towards the cap 1. The cup 6 houses therein a silver oxide positive electrode 5 composed of a mixture of silver oxide and powdery graphite compacted by the use of a binding agent such as polytetrafluoroethylene.

The cup 6 is electrically insulated from the cap 1, and vice versa, by means of an annular gasket 7 which is firmly held in position substantially between the flange 1c of the cap 1 and the flange 6a and annular portion, adjacent the flange 6a, of the central portion 6b of the cup 6 while the flange 6a is crimped inwards during assembly of the cell to substantially hermetically seal the latter. The annular gasket 7 is made of polyamide resin or any suitable resilient electrolyte-resistant material.

Positioned between the zinc negative electrode 2 and the silver oxide positive electrode 5 within the sealed two-part container is an electrolyte-absorbent layer 3, made of matted cotton fibers and situated adjacent and in contact with the negative electrode 2, and a semipermeable separator 4 made of a regenerated cellulose membrane, having its opposed surfaces coated with polyvinyl alcohol, and situated adjacent and in contact with the silver oxide positive electrode 5.

In practice, prior to the two-part container being substantially hermetically sealed in the manner as described above with a stack of the elements 2, 3, 4 and 5 housed therein, alkaline electrolyte is injected into the two-part container and, thereafter, the flange 6a is crimped inwards to substantially hermetically seal the container. The separator 4 is then held in position with its peripheral portion 4a firmly sandwiched between the annular gasket 7 and that annular portion of the central portion 6b of the cup 6 as shown.

In the prior art flat-type dry cell of the construction described above and shown in FIG. 1, the positive electrode 5 is in the form of a disc having a uniform thickness.

As is well known to those skilled in the art, any one of monovalent and divalent silver oxides has a strong oxidizing power and tends to be dissolved partially in the form of silver acidic ions, so that the separator tends to be deteriorated accompanying precipitation and penetration of metallic silver. The deterioration of the separator is considerable with elevation of the temperature and, therefore, depending on the type of application in which the prior art silver-zinc cell is employed, the separator is often employed in the form of an ion-exchange membrane which is generally considered as having an excellent resistance to oxidization.

It has been found that, when silver-zinc cells, each being of the construction shown in FIG. 1, were stored at 45° C. for three months, about 35% of the total number show complete internal self-discharge and the rest have only 20 to 50% of the rated capacity. Close observation of the cells so tested and subsequently disassembled has shown that, while a central portion 4b of the separator 4, which is in contact with an upper face of the positive electrode 5, has not remarkably deteriorated, an annular portion adjacent the periphery of the separator 4 which is in contact with a substantially right-angled peripheral edge 5b on the upper face of the positive electrode 5 was considerably oxidized, and some have shown that the separator 4 had an annular area of breakage substantially in conformity with the contour of the peripheral edge 5b of the positive electrode 5. This phenomenon appears to have resulted from a set-up of internal stresses in the separator due to the sharp contact of the substantially right-angled peripheral edge 5b of the positive electrode 5 with the separator.

SUMMARY OF THE INVENTION

Accordingly, the present invention has been developed in with a view to substantially eliminate the disadvantages and inconveniences inherent in the prior art silver oxide cells and is intended to provide an improved silver oxide primary cell wherein means is provided to avoid the sharp contact of the positive electrode with the separator.

Another object of the present invention is to provide an improved silver oxide primary cell which exhibits excellent shelf life characteristics with the possibility of internal self-discharge being minimized.

According to the present invention, there is provided an improved silver oxide cell comprising a casing composed of a cup and a cap electrically insulated from and received in the cup to define a sealed chamber between the cup and the cap. A stack of positive electrode, separator, electrolyte-absorbent layer and a negative electrode, arranged in the order given above, is housed within the sealed chamber in the casing. As a feature of the present invention, a peripheral edge on at least one surface of the positive electrode, which is held in tight contact with the separator, is chamfered to avoid any sharp contact between the peripheral edge of the positive electrode and the separator such as occurs in the prior art cell of a similar kind.

The chamfered peripheral edge on at least one surface of the positive electrode may be either in the form of a bevel of an angle within the range of 10° to 30° and having a bevelled face of a length within the range of 1 to 3 mm, or in the form of a rounded edge of radius within the range of 0.2 to 0.4 mm., in the case where the positive electrode is in the form of a disc having a diameter of 8 mm. and a thickness of 0.9 mm.

Because of the chamfered peripheral edge provided on at least one surface of the positive electrode according to the present invention, any internal stress set-up which may occur in the separator can advantageously be minimized, which in turn results in improvement in shelf life of the silver oxide cell.

BRIEF DESCRIPTION OF THE DRAWING

These and other objects and features of the present invention will become apparent from the following description taken in conjunction with preferred embodiments thereof with reference to the accompanying drawings, in which.

DETAILED DESCRIPTION OF THE INVENTION

Figure 1:
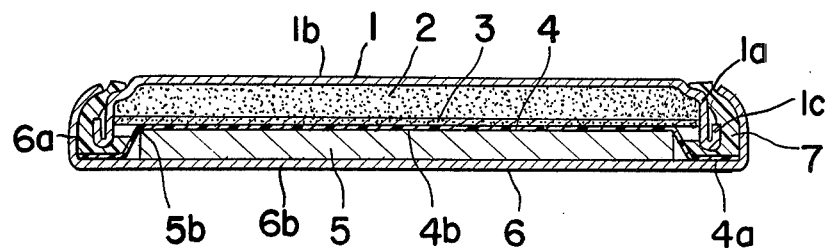
FIG. 1 is a longitudinal sectional view of the prior art silver-zinc cell, reference to which has already been made.

Before the description of the present invention proceeds, it is to be noted that like parts are designated by like reference numerals throughout FIGS. 2 to 7 of the accompanying drawings.

Figure 2:
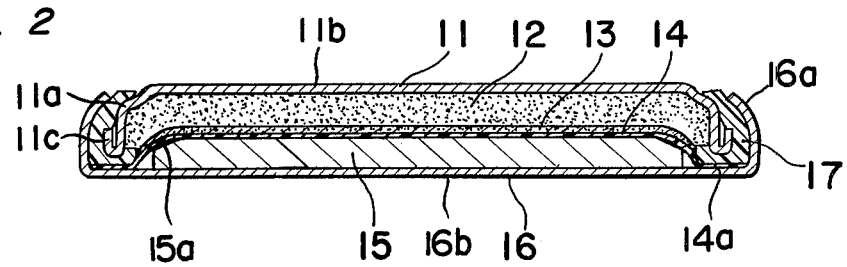
FIG. 2 is a longitudinal sectional view of an improved silver-zinc cell according to one preferred embodiment of the present invention.

Referring now to FIG. 2, a silver oxide cell of flat type comprises a two-part container of substantially circular shape including a cap 11 and a cup 16. The cap 11 serves as a negative terminal member and has its peripheral portion langed at 11a in a direction substantially perpendicular to the plane of the remaining central area 11b of the cap 11 and then bent outwardly backwards to assume a substantially U-sectioned anchor rim 11c. On the other hand, the cup 16 serves as a positive terminal member and has its peripheral portion flanged at 16a in a direction substantially perpendicular to the plane of the remaining central area 16b of the cup 16.

The cap 11 is received in the cup 16 to define a chamber which is sealed off from the atmosphere by means of an annular gasket 17 firmly held in position substantially between the flange 11c of the cap 11 and the flange 16a and annular portion, adjacent the flange 16a, of the central area 16b of the cup 16 while the flange 16a is crimped inwards during assembly of the cell. Because of the intervention of the annular gasket so positioned as described above, the cap 11 and the cup 16 are electrically insulated from each other.

A stack of zinc negative electrode 12, electrolyte absorbent layer 13 employed in the form of a nonwoven cloth of polypropylene of 0.1 mm. in thickness, separator 14 composed of a semipermeable membrane of 0.05 to 0.08 mm. in thickness, and positive electrode 15 composed of silver oxide as its principle component is housed within the sealed chamber of the two-part container with the negative and positive electrodes 12 and 15 respectively held in contact with the central areas 11b and 16b of the cap 11 and the cup 16. In the assembled condition as shown in FIG. 2, the separator 14 has its peripheral portion 14a firmly sandwiched between the annular gasket 17 and that annular portion, adjacent the flange 16a, of the central area 16b of the cup 16.

Preferably, the silver oxide for the positive electrode 15 is employed in the form of either a monovalent silver oxide or a divalent silver oxide.

Figure 3:
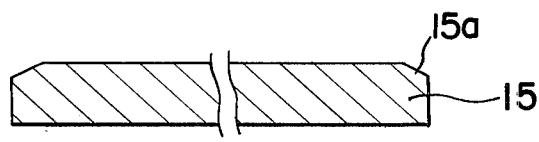
FIG. 3 is a longitudinal sectional view, on an enlarged scale, of a positive electrode employed in the cell shown in FIG. 2.

As best shown in FIG. 3, according to the present invention, at least one of the opposed peripheral edges on respective surface of the positive electrode 15 is chamfered at 15a to have a bevelled face. Alternatively, it may be chamfered to have a rounded edge as best shown in FIG. 4.

Figure 4:
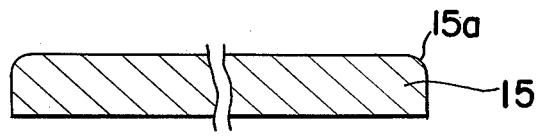
FIG. 4 is a view similar to FIG. 3, showing a modification of the positive electrode.

As hereinbefore described, in the case where the positive electrode 15 is 8 mm. in diameter and 0.9 mm. in thickness, the chamfered face 15a is, if bevelled as shown in FIG. 3, inclined at an angle of bevel within the range of 10° to 30° with the length of the bevelled face being within the range of 1 to 3 mm and, if rounded as shown in FIG. 4, shaped to assume a portion of the imaginary circle of radius within the range of 0.2 to 0.4 mm.

Shown in FIG. 2 is the silver-zinc cell having a capacity of about 40 mAh wherein the positive electrode, 8 mm. in diameter, has the bevelled edge 15a inclined at an angle of bevel of 15° and having a length of 1.75 mm.

It has been found, as a result of tests conducted by the inventors wherein the silver oxide cells, each being of the construction shown in FIG. 2 and having an overall thickness of 2 mm. and an overal diameter of 11 mm., were stored at 45° C. for three months, that no substantial internal self-discharge takes place and 80% of the capacity is retained at minimum. Close observation of the silver oxide cells so tested and subsequently disassembled has shown that no deterioration of the separator 14 in each of the silver oxide cells takes place and it is evident that, because of the provision of the chamfered face 15a, the internal stresses which may otherwise be set up as is the case in the prior art silver-zinc cell are advantageously relieved.

Figure 5:
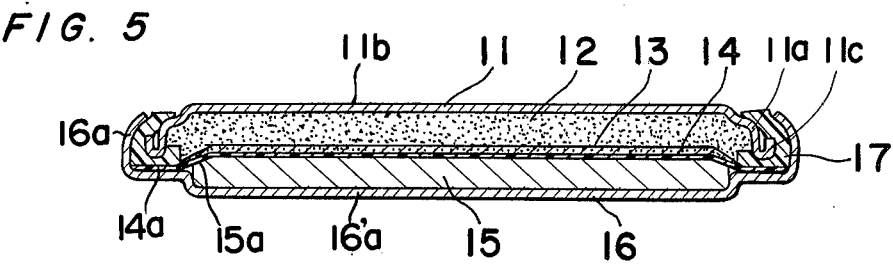
FIG. 5 is a view similar to FIG. 2, showing an improved silver-zinc cell according to another preferred embodiment of the present invention.
Figure 6:
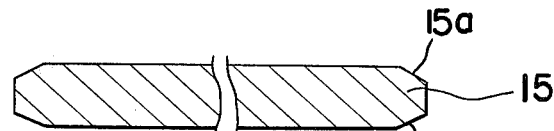
FIGS. 6 and 7 are views similar to FIG. 3, showing further modifications of the positive electrode which may be employed in the present invention.
Figure 7:
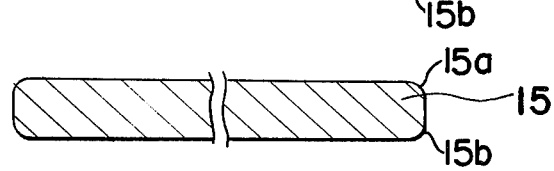

If only one of the opposed peripheral edges on the respective surfaces of the positive electrode 15 is chamfered at 15a as shown in any one of FIGS. 3 and 4, there will be some inconvenience in that, during assembly of the silver oxide cell, the positive electrode 15 may be placed in a wrong position. This inconvenience can advantageously be eliminated if both of the opposed peripheral edges on the respective surfaces of the positive electrode 15 is chamfered at 15a and 15b as shown in any one of FIGS. 6 and 7. If the positive electrode 15 is shaped as shown in any one of FIGS. 6 and 7, the positive electrode 15 may, during the assembly of the silver oxide cell, be placed in position with either of the opposed surfaces thereof facing the central area 16a of the cup 16 and, therefore, there is no possibility that the positive electrode 15 is placed in a wrong position. As shown in FIG. 5, the central area of the cup 16 may be outwardly recessed at 16′a to provide a seat for the positive electrode 15. The provision of the seat for the positive electrode 15 which is defined by the outwardly recessed central area 16′a of the cup 16 is advantageous in that placement of the positive electrode 15 relative to the cup 16 during the assembly of the cell can readily be performed with no substantial displacement of the electrode 15 relative to the cup 16. Preferably, the seat has a depth smaller than the thickness of the positive electrode 15.

Although the present invention has fully been described in connection with the preferred embodiments thereof with reference to the accompanying drawings, it is to be noted that various changes and modifications are apparent to those skilled in the art. Such changes and modifications are, unless they depart from the true scope of the present invention, to be understood as included within such true scope of the present invention.

What we claim is:

1. A silver oxide primary cell of flat type which comprises:
    a casing composed of a cup and a cap electrically insulated from and received in the cup to define a sealed chamber between the cup and the cap;
    a positive electrode having a silver oxide as its principal active material;
    a separator;
    an electrolyte absorbent layer impregnated with an electrolyte;
    a negative electrode having zinc as its principal active material;
    said positive electrode, separator, electrolyte absorbent layer and negative electrode being stacked one above the other in the order given above, the stack being housed within the casing in a manner such that said positive and negative electrodes are held in contact with the cup and the cap, respectively; and
    at least one of the opposed peripheral edges on the respective surfaces of the positive electrode being chamfered to provide a chamfered edge, the entire area of said chamfered edge being in intimate contact with the separator.

2. A silver oxide primary cell as claimed in claim 1, wherein said chamfered edge is a bevelled face.

3. A silver oxide primary cell as claimed in claim 1, wherein said chamfered edge is a rounded edge.

4. A silver oxide primary cell as claimed n claim 1, wherein both of the opposed peripheral edges on the respective surfaces of the positive electrode are chamfered to provide chamfered edges.

5. A silver oxide primary cell as claimed in claim 4, wherein each chamfered edge is a bevelled face.

6. A silver oxide primary cell as claimed in claim 4, wherein each chamfered edge is a rounded edge.

7. A silver oxide primary cell as claimed in claim 1, wherein the area of the cup which is held in contact with the positive electrode is outwardly recessed to provide a seat for the positive electrode, said seat having a depth smaller than the thickness of the positive electrode.

8. A silver oxide primary cell as claimed in claim 1, wherein said silver oxide is a monovalent silver oxide.

9. A silver oxide primary cell as claimed in claim 1, wherein said silver oxide is a divalent silver oxide.

10. A silver oxide primary cell as claimed in claim 1, wherein the chamfered edge of the positive electrode is in the form of a bevel of an angle within the range of 10° to 30° and having a bevelled face of a length within the range of 1 to 3 mm, or in the form of a rounded edge of radius within the range of 0.2 to 0.4 mm, based on a positive electrode which is in the form of a disc having a diameter of 8 mm and a thickness of 0.9 mm.

* * * * *